United States Patent
Bippus et al.

(10) Patent No.: US 7,311,532 B1
(45) Date of Patent: Dec. 25, 2007

(54) CROSSTALK SHIELDING DEVICE FOR CONNECTION STRIPS IN TELECOMMUNICATIONS AND DATA COMMUNICATION

(75) Inventors: Hans-Dieter Bippus, Gwandalan (AU); Bryce Lindsay Nicholls, Avoca Beach (AU)

(73) Assignee: ADC GmbH, Berlin (DE)

( * ) Notice: Subject to any disclaimer, the term of this patent is extended or adjusted under 35 U.S.C. 154(b) by 665 days.

(21) Appl. No.: 09/856,788

(22) PCT Filed: Oct. 14, 1999

(86) PCT No.: PCT/EP99/07756

§ 371 (c)(1),
(2), (4) Date: May 8, 2001

(87) PCT Pub. No.: WO00/31837

PCT Pub. Date: Jun. 2, 2000

(30) Foreign Application Priority Data

Nov. 23, 1998 (DE) ................................. 198 53 837

(51) Int. Cl.
*H01R 13/646* (2006.01)
(52) U.S. Cl. .................. 439/108; 439/94; 439/608; 439/404; 439/865; 439/497; 439/941
(58) Field of Classification Search ................ 439/608, 439/94, 110, 108, 404, 885, 497, 941
See application file for complete search history.

(56) References Cited

U.S. PATENT DOCUMENTS

| 4,582,377 | A |   | 4/1986  | Wilmes              |         |
|-----------|---|---|---------|---------------------|---------|
| 4,824,383 | A | * | 4/1989  | Lemke ............... | 439/108 |
| 4,863,402 | A | * | 9/1989  | Black et al. ........ | 439/736 |
| 5,104,341 | A |   | 4/1992  | Gilissen et al.     |         |
| 5,160,273 | A |   | 11/1992 | Carney              |         |
| 5,460,533 | A | * | 10/1995 | Broeksteeg et al. .. | 439/101 |
| 5,474,472 | A |   | 12/1995 | Niwa et al.         |         |
| 5,494,461 | A |   | 2/1996  | Bippus et al.       |         |
| 5,762,516 | A | * | 6/1998  | Itoga et al. ........ | 439/404 |
| 6,280,242 | B1| * | 8/2001  | Jochen et al. ...... | 439/497 |
| 6,332,810 | B1| * | 12/2001 | Bareel ............... | 439/676 |

FOREIGN PATENT DOCUMENTS

AU       701705       2/1999

(Continued)

OTHER PUBLICATIONS

Notice of Opposition to corresponding European Patent No. 1133814 B1, 16 pages (Mar. 19, 2003).

(Continued)

*Primary Examiner*—Truc Nguyen
(74) *Attorney, Agent, or Firm*—Merchant & Gould P.C.

(57) ABSTRACT

A shielding device for connection strips in telecommunications and data engineering has a number of shielding plates and at least one base rail allocated to the shielding plates. To simplify the process of fitting the shielding device inside a connection strip, the shielding plates (2) and the base rail (3) are integrally formed from a metal sheet (28), and each shielding plate (2) is connected to the base rail (3) via a narrow web (4) and is arranged rotated through approximately 90° with respect to the base rail (3).

15 Claims, 4 Drawing Sheets

FOREIGN PATENT DOCUMENTS

| | | |
|---|---|---|
| DE | 33 12 002 | 5/1984 |
| DE | 36 25 240 C2 | 1/1988 |
| DE | 40 40 551 | 6/1991 |
| DE | 93 10 953.9 | 8/1994 |
| DE | 43 25 952 C2 | 2/1995 |
| EP | 0 563 942 A2 | 10/1993 |
| EP | 0 766 352 A2 | 4/1997 |
| EP | 1133814 B1 | 6/2002 |
| WO | WO 98/08276 | 2/1998 |

OTHER PUBLICATIONS

Reference D6 in the Notice of Opposition, picture of a grounding assembly, 1 page.

Reference D7 in the Notice of Opposition, *Grille de Masse pliée* (drawing of a grounding assembly), 1 page (1988).

Reference D8 in the Notice of Opposition, Affidavit of Guy Métral including 3 attachments, 4 pages (Mar. 18, 2003).

English Abstract of DE3625240, which was previously submitted.

\* cited by examiner

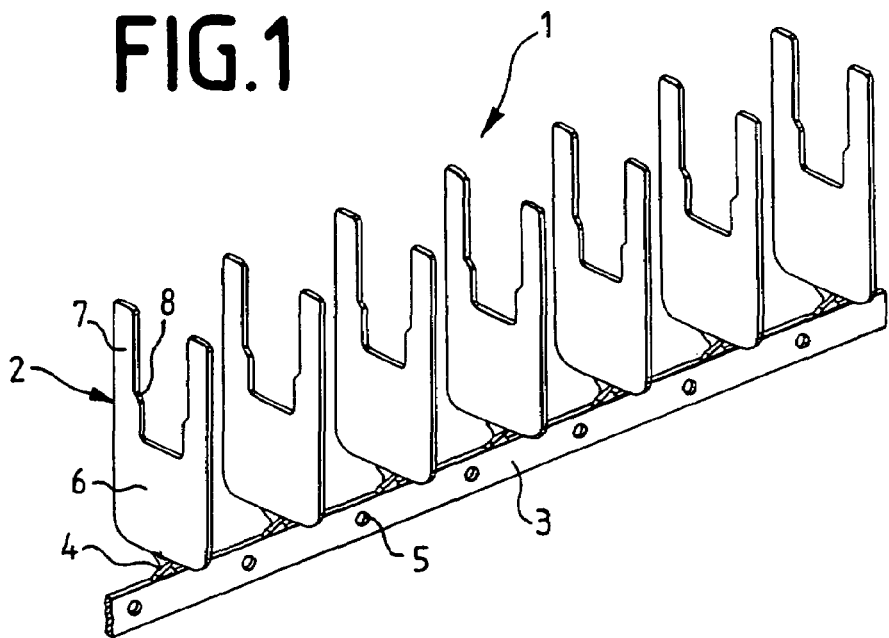
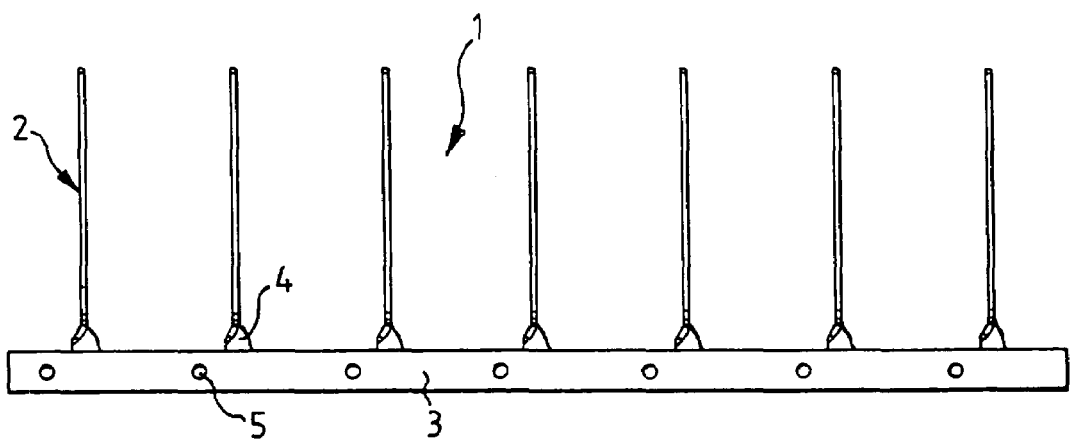
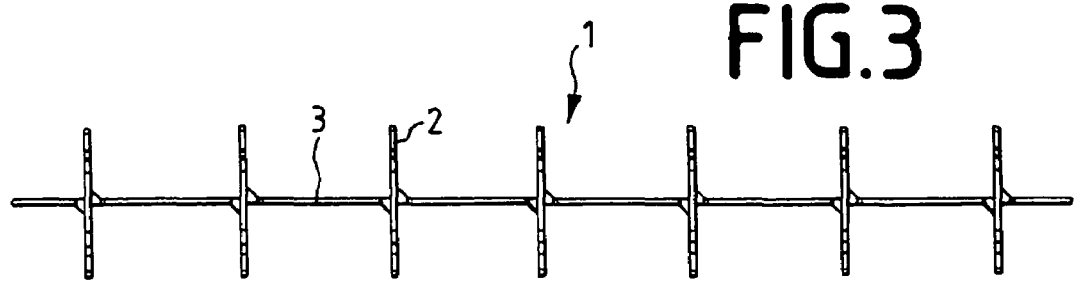

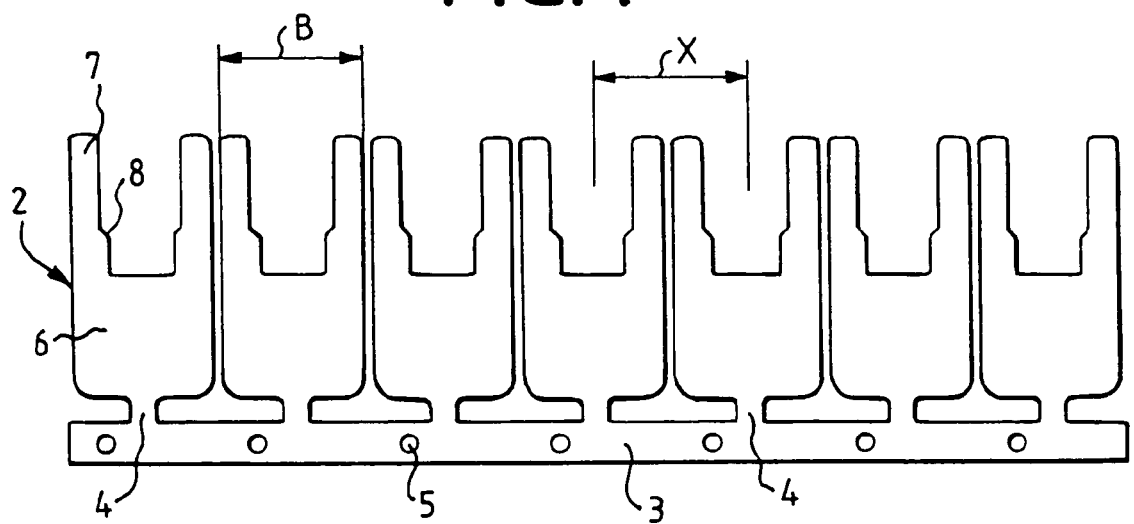
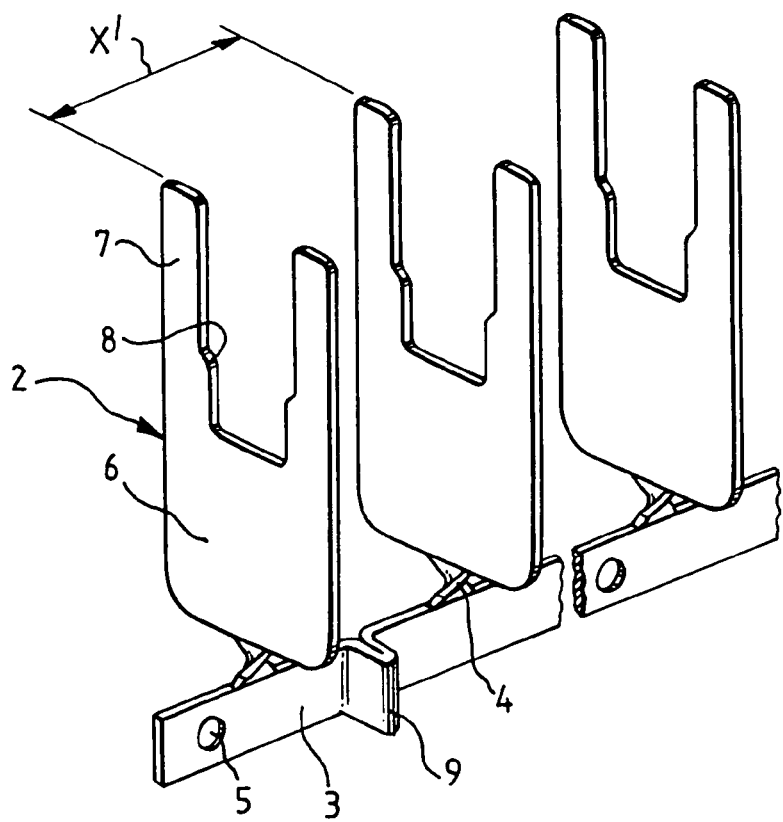

CROSSTALK SHIELDING DEVICE FOR CONNECTION STRIPS IN TELECOMMUNICATIONS AND DATA COMMUNICATION

FIELD OF THE INVENTION

The invention relates to a shielding device for connection strips in telecommunications and data engineering, comprising a number of shielding plates and at least one base rail allocated to the latter.

BACKGROUND OF THE INVENTION

A shielding device of the generic type is already known from the connection strip disclosed in U.S. Pat. No. 5,160,273. Here, the problem of crosstalk between adjacent insulation-piercing terminal contact elements of the connection strip is solved by the insertion of a multiplicity of electrically conductive shielding plates between the individual pairs of insulation-piercing terminal contact elements. The problem of crosstalk occurs when transmitting large volumes of information via electrical lines, the information being transmitted at high frequencies. Transmitting at high frequencies produces radiation and interference between adjacent lines, particularly when these lines are arranged close beside one another in the connection strip. Electrically conductive shielding plates are inserted between a pair of insulation-piercing terminal contact elements, the spacing between two adjacent pairs of insulation-piercing terminal contact elements being larger than the spacing between adjacent insulation-piercing terminal contact elements in a pair. The shielding plates are in this case inserted between pairs of insulation-piercing terminal contact elements in slots which extend transversely to the longitudinal direction of the plastic body of the connection strip, and contact the base rail situated in the longitudinal direction inside the plastic body. A disadvantage of this is that, when fitting the component into the plastic body, it is first necessary to fit the base rail, which has contact tongues for contacting the individual shielding plates, and that it is subsequently necessary to push the individual shielding plates into the connection strip. Consequently, the complexity of assembly is relatively high in order to provide the connection strip with the shielding device for high transmission rates in telecommunications and data engineering.

SUMMARY AND OBJECTS OF THE INVENTION

The invention is therefore based on the object of improving the shielding device of the generic type in order to simplify assembly.

To achieve this object, the invention provides for the shielding plates and the base rail to be integrally formed from a metal plate, and for each shielding plate to be connected to the base rail via a narrow web and arranged rotated through approximately 90° with respect to the base rail. The shielding device according to the invention thus forms an integral component which is made of metallic material and which, during assembly of a connection strip for telecommunications and data engineering, is inserted into the plastic housing of the connection strip with its base rail, and its shielding plates, which are integrally connected to the base rail, are guided into all the preformed slots inside the connection strip at the same time. This simplifies assembly considerably.

In a further embodiment of the invention, the spacings between the shielding plates on a base rail may be designed to be different from one another. This enables a shielding plate to be matched to different applications.

The invention also relates to a method of producing the shielding device wherein a number of shielding plates and a base rail supporting the latter, as well as webs connecting the shielding plates to the base rail, are integrally formed from a metal sheet. The shielding plates are subsequently rotated in the region of the webs through approximately 90° with respect to the base rail.

According to a further aspect of the invention, a connection strip is provided for telecommunications and data engineering. The connection strip has insulation-piercing terminal contact elements arranged in a plastic housing, and shielding plates arranged between said insulation-piercing terminal contact elements. At least one ground rail is allocated to the shielding plates. The shielding plates and the base rail are integrally formed from a metal sheet. Each shielding plate is connected to the base rail via a narrow web and is arranged rotated through 90° with respect to the base rail.

According to still another aspect of the invention, a process for using a shielding device comprising a base rail and shielding plates is provided wherein the shielding plates are integrally formed on the base rail and are rotated through 90° with respect to the base rail. The device si used as a shielding inside a connection strip for high transmission rates in telecommunications and data engineering applications.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a perspective illustration of the shielding device;

FIG. 2 is a front view of the device of FIG. 1;

FIG. 3 is a plan view of the device of FIG. 1;

FIG. 4 is a plan view of a metal sheet having punched-out shielding plates and the base rail;

FIG. 5 is a perspective illustration, corresponding to FIG. 4, of a part of the shielding device having a folded base rail;

DESCRIPTION OF THE PREFERRED EMBODIMENTS

Figure 6:
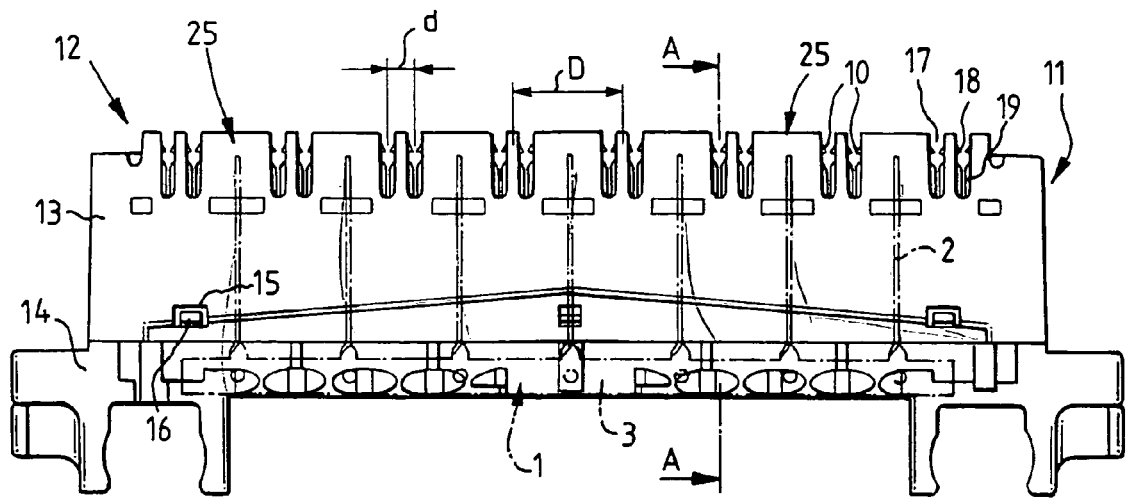
FIG. 6 is a side view of a connection strip.

Referring to the drawings in particular, in the exemplary embodiment, the shielding device 1 comprises seven flat, essentially U-shaped shielding plates 2, a base rail 3 and seven connection webs 4, which connect the individual shielding plates 2 to the base rail 3. The shielding device 1 is made of conductive metallic material and is integrally formed, in particular punched, with the shielding plates 2, the base rail 3, and the connection webs 4, from a metal sheet 28. The sheet metal 28 is particularly copper, copper alloys, steel or aluminum. The shielding plates 2 and the base rail 3 with the connection webs 4 are initially in the same plane as the metal sheet 28 (as shown in FIG. 4). In a work step which follows the cutting-out process, the individual shielding plates 2 are rotated in the region of their connection webs 4 through 90° with respect to the base rail 3. A hole 5 in the base rail 3 is associated with each shielding plate 2 close to the connection web 4, and this hole 5 is used for adjustment during the 4 production process. The metal sheet 28 may also be a metalized plastic strip or the like.

In the view of how the shielding device 1 is processed, shown in FIG. 4, the individual shielding plates 2 are of U-shaped design, a roughly rectangular shielding panel 6 adjoining the connection web 4 and being provided with two prong-like shielding forks 7 at the end remote from the connection web 4. These shielding forks 7 are stepped by means of a shoulder 8 which tapers the cross section so that they are matched to the internal cross section of the connection strip 11.

FIG. 4 shows the metal sheet 28 with cut-out or punched-out shielding plates 2 of width B with a mean spacing X between one another and with the cut-out or punched-out base rail 3 with the holes 5 which are used for adjustment during production. The length of the metal sheet 28 corresponds to the number of shielding plates 2 of width B plus the cut gaps.

Figure 8:
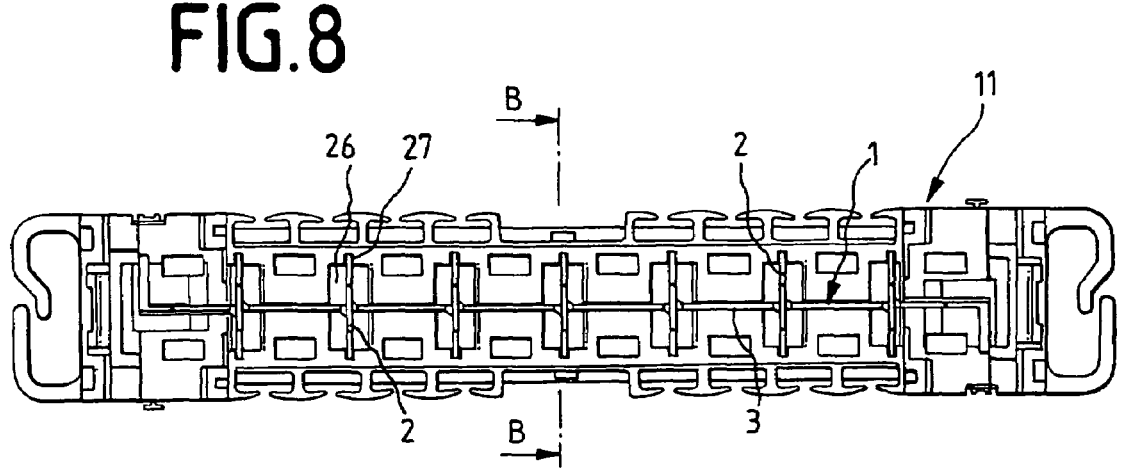
FIG. 8 is a plan view of the connection strip shown in FIG. 6.

FIG. 5 shows the shielding plates 2 which are rotated through 90° with respect to the base rail 3 and are normally at a distance X from one another. To achieve a shorter distance X', a fold 9 is introduced into the base rail 3, as shown in FIG. 8.

The shielding device 1 is used for shielding the individual insulation-piercing terminal contact elements 10 inside a connection strip 11 for high transmission rates in telecommunications and data engineering. Such a connection strip 11, having a plurality of insulation-piercing terminal contact elements 10 arranged in pairs, is illustrated and described in more detail in DE 43 25 952 C2 (and in U.S. Pat. No. 5,494,461). U.S. Pat. No. 5,494,461 is hereby incorporated by reference. The connection strip 11 is illustrated in FIGS. 6 to 9 and is described in more detail below with respect to the shielding device 1 used.

The connection strip 11 comprises a plastic housing 12 made of an upper part 13 and a lower part 14 which are latched to one another by means of latching openings 15 in the upper part 13 and latching lugs 16 in the lower part 14. Terminal slots 17 are formed in the upper part 13 and have integrally formed terminal lugs 18 and terminal webs 19 which serve to hold the insulation-piercing terminal contact elements 10. The latter are formed from sheet-like flat material and comprise two contact webs 21 enclosing a contact slot 20 between them. A base web 22 is adjoined by contact fingers 23 which merge into spring contacts 24. Two pairs of insulation-piercing terminal contact elements 10 are respectively arranged close beside one another, the spacing D between two adjacent pairs of insulation-piercing terminal contact elements 10 being considerably larger than the spacing d between insulation-piercing terminal contact elements 10 which are close beside one another, as can be seen in FIG. 6. The individual shielding plates 2 of the shielding device 1 are inserted into the total of seven wider cross-sectional regions 25 of the connection strip 11, as shown by dashed lines in FIGS. 6 and 7 and by solid lines in FIGS. 8 and 9.

Figure 7:
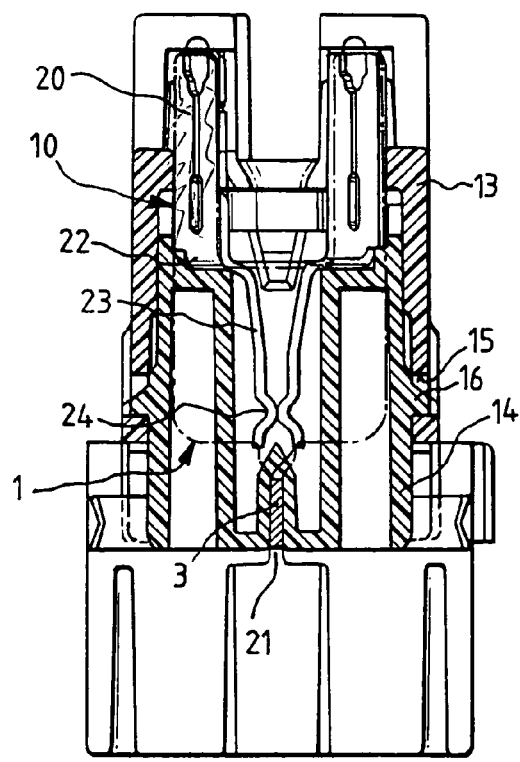
FIG. 7 is a cross sectional view along the line A—A in FIG. 6.
Figure 9:
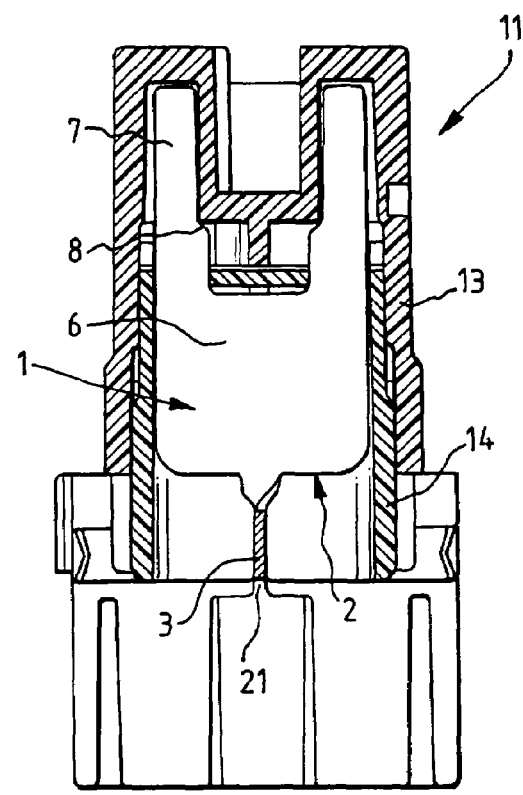
FIG. 9 is a cross sectional view along the line B—B in FIG. 8

To insert the base rail 3 with the individual shielding plates 2 into the housing 12 of the connection strip 11, the upper part 13 in the exemplary embodiment contains seven chambers 26 with respective transverse slots 27 into which the individual shielding plates 2 are pushed. The base rail 3 is situated in a longitudinal slot 21 in the bottom region of the lower part 14, as shown in FIGS. 7 and 9. The shielding panels 6 and shielding forks 7, which adjoin the latter, of the individual shielding plates 2 essentially take up the whole of the cross section of the interior of the connection strip 11, as shown in FIG. 9 in particular, and thus separate the individual pairs of insulation-piercing terminal contact elements 10 in such a manner that greater crosstalk attenuation is achieved for high transmission rates as a result of the electrically conductive shielding plates 2. The use of the large-area electrically conductive shielding plates 2 in the connection strip 11 does not require the physical volume of the connection strip to be enlarged, nor any greater expense to produce it.

The shielding device 1 does not require any grounding. It is important only that the individual shielding plates 2 are conductively connected to one another. This is achieved by means of the base rail 3, which is common to all the shielding plates 2. The shielding plates 2 influence the electrical field in such a way that the influence charging of an insulation-piercing terminal contact element 10 is reduced in the adjacent insulation-piercing terminal contact element 10, and the interference voltage is thus small. This produces a relatively high signal-to-noise ratio. The signal-to-noise ratio becomes higher, with the result that higher frequencies can be transmitted without the adjacent lines of the insulation-piercing terminal contact elements 10 having an adverse effect on one another.

The number of shielding plates 2 in a shielding device 1 depends on the number of pairs of insulation-piercing terminal contact elements 10. In the exemplary embodiment, an 8-pair module is illustrated, which has seven chambers 26 for a total of seven shielding plates 2. Common pairings are 4/3, 8/7, 10/9, 12/11, 16/15, 20/19, 24/23 and 25/24, where the number of pairs of insulation-piercing terminal contact elements 10 and the number of shielding plates 2 are indicated in each case.

For a HIGHBAND® brand 8 connection strip 11, the standard spacing X between the shielding plates 2 is X=12.6 mm. However, for a HIGHBAND® brand 10 connection strip 11, for example, the spacing is X'=9.6 mm. For this, the folds 9 are introduced into the base rail 3 between each of the individual shielding plates 2. This spacing cannot be achieved by directly punching the shielding device 1 out of a metal sheet 28, since the width B of the individual shielding plate 2 needs to be around 12 mm on account of the width of the connection strip 11. Hence, for a HIGHBAND® brand 8 connection strip 11, 10 the dimensions width B=12.6 mm and spacing X=12.6 mm complement one another well. For a narrower spacing X', however, folds 9 are necessary; these may be replaced by any other kind of means for shortening the length of the base rail 3.

While specific embodiments of the invention have been shown and described in detail to illustrate the application of the principles of the invention, it will be understood that the invention may be embodied otherwise without departing from such principles.

The invention claimed is:

1. A connection strip, comprising:
   a plastic housing;
   insulation-piercing terminal contact elements arranged in said plastic housing;
   shielding plates arranged between said insulation-piercing terminal contact elements; and at least one base rail connected to said shielding plates, said shielding plates and said base rail being integrally formed from a metal sheet with each shielding plate being connected to said base rail via a web and being arranged rotated approximately 90° with respect to said base rail.

2. A connection strip in accordance with claim 1, wherein:
said shielding plates are spaced from said insulation-piercing terminal contact elements.

3. A connection strip in accordance with claim 1, wherein:
said shielding plates are electrically insulated from said insulation-piercing terminal contact elements.

4. A connection strip in accordance with claim 1, wherein:
said web includes a substantially 90 degree twist;
said shielding plates and said base rail are substantially flat.

5. A connection strip in accordance with claim 1, wherein:
a width of said web is narrower than a width of said shielding plates.

6. A connection strip in accordance with claim 1, wherein:
one end of each of said webs is connected to said base rail and is substantially parallel with said base rail plane;
another end of each of said webs is connected to said shielding plate and is substantially parallel with said plane of said shielding plate.

7. A connection strip in accordance with claim 1, wherein:
said insulation-piercing terminal contact elements are arranged on a first side of said housing and extend toward a middle of said housing;
said base rail is arranged on a second side of said housing substantially diametrically opposite said first side of said housing;
said shielding plates extend from said base rail toward said middle of said housing.

8. A connection strip in accordance with claim 2, wherein:
said shielding plates are electrically insulated from said insulation-piercing terminal contact elements.

9. A connection strip in accordance with claim 8, wherein:
said web includes a substantially 90 degree twist;
said shielding plates and said base rail are substantially flat.

10. A connection strip in accordance with claim 9, wherein:
a width of said web is narrower than a width of said shielding plates.

11. A connection strip in accordance with claim 10, wherein:
one end of each of said webs is connected to said base rail and is substantially parallel with a base rail plane;
another end of each said webs is connected to said shielding plate and is substantially parallel with a plane of said shielding plate.

12. A connection strip in accordance with claim 11, wherein:
said insulation-piercing terminal contact elements are arranged on a first side of said housing and extend toward a middle of said housing;
said base rail is arranged on a second side of said housing substantially diametrically opposite said first side of said housing;
said shielding plates extend from said base rail toward said middle of said housing.

13. A connection strip in accordance with claim 2, wherein:
said insulation-piercing terminal contact elements are arranged on a first side of said housing and extend toward a middle of said housing;
said base rail is arranged on a second side of said housing substantially diametrically opposite said first side of said housing;
said shielding plates extend from said base rail toward said middle of said housing.

14. A connection strip in accordance with claim 3, wherein:
said insulation-piercing terminal contact elements are arranged on a first side of said housing and extend toward a middle of said housing;
said base rail is arranged on a second side of said housing substantially diametrically opposite said first side of said housing;
said shielding plates extend from said base rail toward said middle of said housing.

15. A connection strip in accordance with claim 4, wherein:
said insulation-piercing terminal contact elements are arranged on a first side of said housing and extend toward a middle of said housing;
said base rail is arranged on a second side of said housing substantially diametrically opposite said first side of said housing;
said shielding plates extend from said base rail toward said middle of said housing.

* * * * *

UNITED STATES PATENT AND TRADEMARK OFFICE
CERTIFICATE OF CORRECTION

| | | |
|---|---|---|
| PATENT NO. | : 7,311,532 B1 | Page 1 of 1 |
| APPLICATION NO. | : 09/856788 | |
| DATED | : December 25, 2007 | |
| INVENTOR(S) | : Bippus et al. | |

It is certified that error appears in the above-identified patent and that said Letters Patent is hereby corrected as shown below:

Title page, (86): "May 8, 2001" should read --August 8, 2001--

Col. 5, line 22, claim 6: "with said base rail plane;" should read --with a base rail plane;--

Col. 5, lines 24-25, claim 6: "with said plane of" should read --with a plane of--

Signed and Sealed this

Fifth Day of August, 2008

JON W. DUDAS
*Director of the United States Patent and Trademark Office*